May 21, 1968 G. A. FREDERICK ETAL 3,384,512
PIGGING DEVICE AND DETECTION SYSTEM
Filed Oct. 21, 1966 2 Sheets-Sheet 1
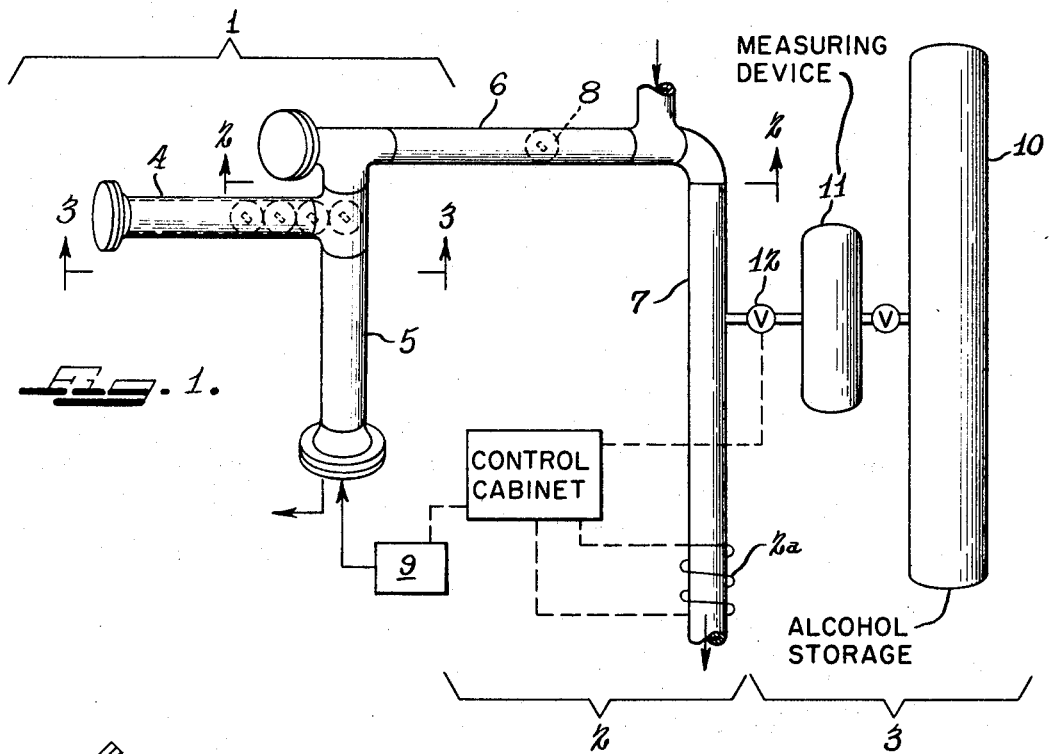
Fig. 1.
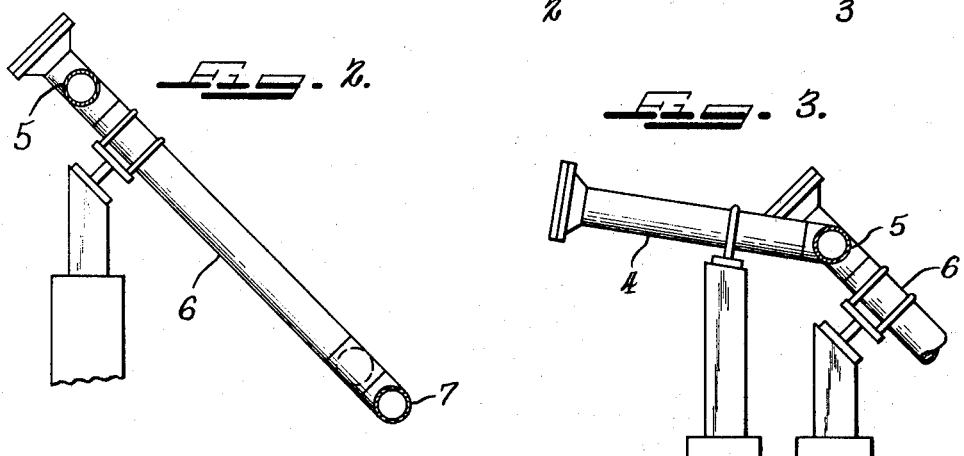
Fig. 2. Fig. 3.
Fig. 5.
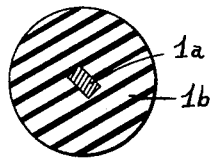
INVENTORS
GEORGE A. FREDERICK
LEONARD E. BURCHARD
BY
Barr, Freeman & Molinare
Attys.

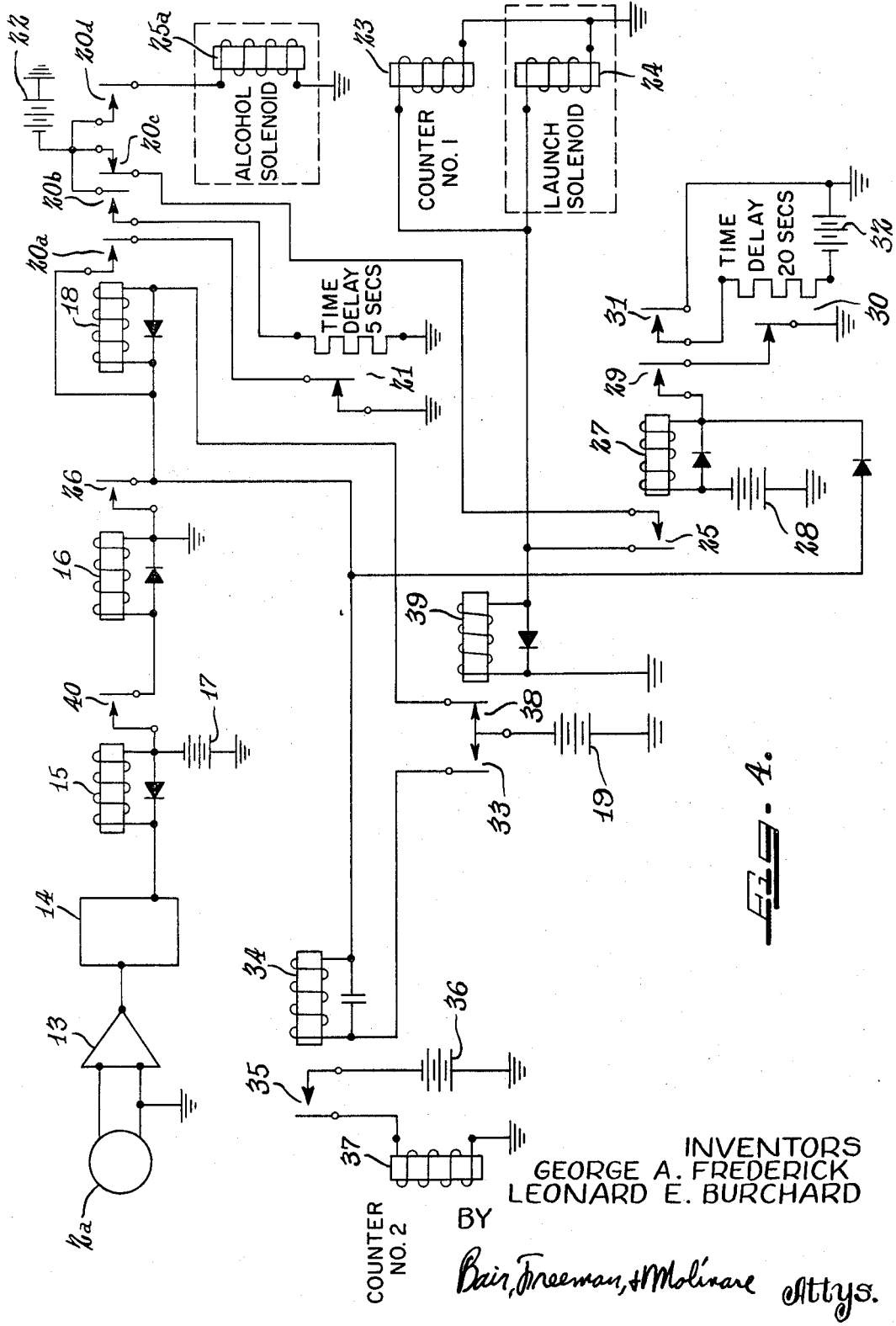

United States Patent Office 3,384,512
Patented May 21, 1968

3,384,512
PIGGING DEVICE AND DETECTION SYSTEM
George A. Frederick, Wheaton, and Leonard E. Burchard, Oak Forest, Ill., assignors to Peoples Development Inc., a corporation of Delaware
Continuation-in-part of application Ser. No. 505,625, Oct. 29, 1965. This application Oct. 21, 1966, Ser. No. 611,185
13 Claims. (Cl. 134—8)

ABSTRACT OF THE DISCLOSURE

A pigging device launching detecting system. Means are provided for launching a pigging device into a carrying line. An electrical sensing means is provided for responding to the passage of a magnet-containing pigging device past a predetermined point in the pipeline. Control means are operable in response to signals from the electrical sensing means and are adapted to regulate the launching means.

---

This application is a continuation-in-part of application Ser. No. 505,625 filed Oct. 29, 1965, now abandoned.

This invention relates to an improved system for controlling the launch and detection of so-called "pigging" devices in a gathering system such as that used for conveying natural gas from individual wells or production areas to collection points. In particular, the invention relates to an improved pigging device detection and control system which is operated by electrical sensing means to eliminate problems heretofore encountered using mechanical means.

By way of background, operation of a large-volume, cross-country, natural gas transmission pipeline involves, at the producing end of the pipeline, the operation of a very extensive gathering system. The gathering system conveys natural gas from individual wells or individual production areas to collection points where the gas is then passed to the main, long distance-large volume transmission line. The gathering system pipelines are normally smaller in diameter than the main gas transmission line.

The operation of a gathering system is very complex, because many different types of natural gases, including natural gas of varying liquid condensate content, natural gas of varying sulfur and corrosive component content, and varying amount of moisture are handled. The gathering systems usually consist of 4- to 12-inch diameter pipe or larger, and have a great number of valves, fittings and pressure regulators installed to control the flow of gas from the various producing wells. Problems in efficient operation and maintenance of these gathering systems are introduced due to liquid condensate accumulation, fouling due to corrosive components in the natural gas, and the formation of hydrocarbon hydrates. These hydrates, mixtures of hydrocarbons and water, freeze at temperatures well above normal freezing points for either the hydrocarbons or water separately and often completely plug the gathering system pipeline.

It is common practice in the operation of these gathering systems to clean the interior of the pipelines by a process known as pigging. A pipeline pig for this operation usually consists of a hard rubber sphere of substantially the same diameter as the interior of the pipe section to be cleaned. The pig is introduced into the pipeline through a separate connection known as a pig launcher. The pig travels through the section of pipe which is identical to its diameter and pushes the deposits described above, ahead of itself, and in the direction of the gas flow. These deposits are then transferred to a larger pipe section where for example, the 4-inch main joins a 6- or 8-inch section of the gathering system. At this junction another pigging sphere is introduced. This additional pig is appropriately sized for the larger pipe and continues with the cleaning action of the system. This larger pig traps and pushes the smaller pig as well as the deposits collected by the smaller pig.

In a gathering system composed of several different sizes of pipelines, there must be provided pig launchers and pigging spheres sized for each pipeline diameter.

The cleaning process involves the launching and detection of pigs as they travel through the pipeline. In addition, it is desirable in some cases to dilute or to clean the hydrate formations by injecting alcohol such as methanol or ethanol into the pipeline. Alcohol will dissolve the hydrocarbon hydrates and allow them to be pushed through the pipeline to a point where they can be collected and removed without plugging the main lines.

The use of alcohol for removal of the cleaning operation depends upon knowing the exact location of the pigs in each of the pipe legs of the gathering system. The precise time for launching the next larger pig is determined when the smaller pig reaches a junction point or a pipe diameter change in the gathering system. In practice, it has been very difficult to identify and locate pigs of various sizes and to time the alcohol injections to accomplish the cleaning of the gathering system.

The current practice in locating and timing pipe pigs is to use a mechanical contact tripping device to sense the passage of a pig. This device has an arm or a shaft extending into the pipeline such that the spherical pig traveling in the pipeline makes physical contact with the arm or shaft causing the arm to move. This arm movement is used to actuate external devices to cause another pig to be launched, or to release an alcohol injection, or to otherwise identify and locate pigs in the system.

However, use of mechanical trip devices has not been satisfactory. Hydrate plugs, slugs of liquid condensates and other deposits inside the pipe cause the mechanical shaft or arm to move and thus give a false indication that a pigging sphere has passed that point. Also, hydrates may cause the contact shaft to freeze, preventing the device from detecting the passage of any objects. In addition, methods for attaching a timing device to the mechanical shaft to launch additional pigs or control alcohol injection have not been practical or feasible.

In order to solve the problem in the art of detecting and counting pigging devices, we have developed a unique and novel system for precisely identifying and counting the devices. Our system also provides timing functions so that alcohol injections can be precisely controlled. Further, a launching signal for pigs following alcohol injection is provided. This new method of precisely locating, counting, and controlling the flow of pigging devices has measurably reduced the cost of maintaining gathering systems for natural gas transmission lines and has increased the lifetime and efficiency of operation of the gathering systems.

It is therefore an object of our invention to provide a pigging device launch and detection system whereby complete accuracy is attained in the timed launching of devices and in the detection of launched devices.

It is a further object of our invention to provide such a system which is free from mechanical failures due to impurities in natural gas gathering system lines.

It is yet another object of this invention to provide such a system wherein the launching and detection of pigging devices is accomplished by electrical sensing and control means thus eliminating all need for mechanical contact between pigging devices and position sensing means.

It is a further object of this invention to provide a pigging device launching and detection system into which is integrated a system for time-controlled injection of alcohol into the gas gathering lines, coordinated with the launching of new pigging devices.

It is a further object of this invention to provide a novel pigging device which is capable of actuating an electronic control and detection system upon passing a predetermined point in a gas line.

The above and other objects will become apparent as the invention is more fully described hereinafter.

In the drawings:

FIG. 1 is a schematic diagram showing a top view of the pig launcher, and the detection and control systems of the invention;

FIG. 2 is a side view along line 2—2 of FIG. 1;

FIG. 3 is a side view along line 3—3 of FIG. 1;

FIG. 4 is a circuit diagram showing the system control elements; and

FIG. 5 is a view in section of one embodiment of the novel pigging device of the invention.

In the practice of our invention the following principle is utilized: a permanent magnet passing through or by a coil of wire will induce an electric voltage in the coil which in turn will operate counters and other devices to detect, locate, and time the passage of pigging devices. To accomplish this, a permanent magnet is positioned in the interior of each of the rubber pig devices and a coil of wire is wrapped around or placed on the outside of the pipe at the point where it is wished to detect passage of the devices.

In earlier practice of this basic idea, we had tried to locate the coil on the inside of the pipeline because it was thought that the pipeline steel itself would conduct all magnetic fields to ground. Surprisingly, however, upon attempting to determine the amount of pickup that could be obtained on the outside of the pipeline, we discovered that there was enough measurable signal on the exterior surface of the pipeline to allow proper operation of our electronic detector, counter, and launcher control mechanisms. This greatly simplified the problem of installing a detector on a high pressure gas gathering system. Since the pick-up system is external to the pipeline, there is not need to design special transducers or pick-up coils that would be both explosion proof and useful for detection service at high pressures.

In the operation of this detection device, we insert permanent magnets in the interior of each of the rubber pigging devices such as the sphere as shown in FIG. 5. Although the shape and placement of the magnet is not critical, we have found that Alnico magnets illustrated at 1a in FIG. 5, of cylindrical shape, approximately 1-inch in height and 1½ inches in diameter, are quite suitable for use with a rubber pigging device as illustrated at 1b in the 4-inch to 12-inch diameter sizes. These Alnico magnets have a field strength of approximately 2000–3000 gauss. We have found that the geometry of the magnetic pick-up coil needed for detection of these spheres with our system is independent of the pipe diameter, the diameter of device, or magnet embedded in the device. Also, the magnet need not be embedded at the center of the device, a surface or intermediate location being satisfactorily operable.

We have further found that a coil of wire wrapped circumferentially around the pipe works equally as well as a loop coil placed horizontally alongside the pipe wall section. Thus the desired practice in the operation of this invention is to wrap the coil around the circumference of the pipe, although it is within the scope and spirit of our invention to locate the wire in any configuration whatsoever so long as it picks up a detectable signal from an internally moving device. This practice of circumferential wrapping greatly increases the mechanical strength of the coil, as well as lends stability and ease of installation.

Referring to FIG. 1, our pig launching and detection system comprise basically three parts: a pneumatically-operated pig launcher shown generally at 1; a control and detection section shown generally at 2 including a wire coil 2a wrapped circumferentially around a gas line and a control cabinet containing electrical control elements hereinafter described; and an alcohol injection system shown generally at 3.

Pig launcher 1 consists of a pig storage pipe 4 into which rubber pigs having in their interior a permanent magnet as above described are loaded from the left as shown in FIG. 1. Pipe 4 is slightly inclined to the horizontal as shown in FIG. 3. Pipe 5, generally horizontally oriented, houses a pneumatic launcher consisting of an axially slidable piston (not shown) which reciprocates in pipe 5 upon pneumatic actuation from a source of compressed air 9 to force a pig into pipe 6. The pneumatic launcher is well known in the art and is similar to the ones heretofore used in pig launching systems. As can be seen from FIGS. 2 and 3, pipe 6 is oriented at about 45° to the horizontal so that a pig driven to its upper end will then fall under the combined force of gravity and pneumatic pressure down into gas line 7 as shown schematically by spherical device 8. Once into gas line 7, the pig is then forced by the flow of gas in the gas line toward coil 2a and on downstream.

Alcohol injection system 3 consists of a storage tank 10, generally horizontally oriented, connected by a suitable valve or orifice to a measuring device 11. Device 11 in turn is connected to gas line 7 by means of control valve 12 which is opened and closed in response to electrical signal from the control cabinet, hereinafter more fully described. Measuring device 11 is basically a calibrated cylindrical container which holds an amount of alcohol desired for a single injection into line 7. After emptying through valve 12 in response from the control cabinet, the measuring device is refilled from storage tank 10 in preparation for the next injection.

The operation of the electronic amplifying and control circuit and signal detection device is briefly explained as follows: A pigging device containing a magnet and coming from upstream in the gas line moves through coil 2a wrapped around pipeline 7 as shown in FIG. 1 and produces a small voltage due to this movement. This electrical voltage or pulse is the input to electronic circuitry which performs the following action: (1) The signal is first amplified and then is directed by gating circuitry, namely a counter (not shown) that determines if this is a device upon which a larger device is to be launched. (2) If it is determined to launch a device, alcohol is then injected into the pipeline for a pre-determined interval of time. The duration of the alcohol injection period is controlled by a thermal delay-relay. (3) The launched device enters the pipeline upstream of coil 2a, thus necessitating the newly-launched device to pass through it. Circuitry that had been preset by the initial device passing through the coil directs the second induced pulse from the coil to a counter which indicates the successful launch of a new device. (4) Two electronic mechanical counters are provided, one to show the accumulation of detected devices and the other to show the accumulation of launched devices.

FIG. 4 shows the circuitry used in our invention. Both relay and solid state circuits have been utilized and found to be reliable in operation. FIG. 4 is a relay circuit, but it should be understood that such circuit can be fully transistorized to provide a reliable and compact control system.

In FIG. 4, coil 2a is connected to amplifier 13 and then through an electronic counter which includes a high impedance matching device 14, well-known in the art, to a first coil 15 and, through contacts 40 to a second coil 16. Coils 15 and 16 are powered by battery 17 or other source of direct current. Coil 15 controls contacts 40 which close upon energizing coil 15. Coil 16, when energized upon closing contacts 40, closes contacts 26 which completes a circuit through coil 18 to battery 19 through normally-closed contacts 38, and also completes a circuit through coil 27 to battery 28. Coil 18, powered by battery 19, controls four sets of contacts 20a, 20b, 20c and 20d. Contacts 20a complete a circuit from battery 19 through coil 18 to one contact of a thermal time delay 21 to ground. Contacts 20b complete a circuit between battery 22 and the coil of thermal time delay 21 to ground. Contacts 20c, normally closed, complete a circuit between battery 22 and first counter 23 and pig launch solenoid 24, when contacts 25 are closed. Counter 23 and solenoid 24 are in parallel and operate independently of one another. Contacts 20c also complete a circuit between battery 22 and coil 39 to ground, when contacts 25 are closed. Contacts 20d complete a circuit between battery 22 and alcohol injection solenoid 25a.

Contacts 29 complete a circuit between battery 28 and one contact of time delay 30 to ground. Contacts 31 complete a circuit from battery 32 through the coil of thermal time delay 30 to ground. Contacts 33 complete a circuit between battery 19 through coil 34 to ground through contacts 26, when closed. Contacts 35 complete a circuit between battery 36 and second counter 37 to ground.

The operation of the above described circuit will now be described. When a magnet-containing pigging device passes through coil 2a from upstream in a gasline, a pulse is generated, and a counter device determines whether this is a pig which is to signal the launch of a new pig. If so, the pulse generated in the coil is amplified and energizes coil 15 to close contacts 40. In turn, coil 16 is energized through the closed circuit comprising battery 17, closed contacts 40, coil 16 and ground. Contacts 26 are then closed which energizes both coils 18 and 27.

Coil 27 closes contacts 29 and 31 to start time delay 30 which holds contacts 25 closed for 20 seconds. Coil 18 closes contacts 20a and 20b starting time delay 21 which holds closed the circuit through contacts 20a for 5 seconds. Contacts 20c, normally closed, are open during the 5 second delay so that counter 23 and launch solenoid 24 are not energized by battery 22.

During the 5 second delay when coil 18 is energized, contacts 20d are held closed and the alcohol solenoid is energized and alcohol is injected into the pipeline. At the end of 5 seconds, time delay 21 breaks the circuit through contacts 20a which de-energizes coil 18, opens contacts 20d so that alcohol injection stops, and permits contacts 20c to close. Contacts 25 remain closed, of course, since time delay 30 is still activated. With contacts 20c closed, the circuit from battery 22 to counter 23 and launcher solenoid 24 is closed so that a new pig is launched and the detected pig is counted. At the same time, coil 39 is energized and contacts 33 are closed providing potential to one terminal of coil 34. The other terminal is connected to contacts 26 which are open so counter 37 does not register.

For the duration that time delay 30 is closed (15 seconds after time delay 21 opens), counter 37 is activated and will record an event when the newly launched pig passes through coil 2a and causes contacts 26 to close. Such event will not energize relay 18 to start a new cycle since contacts 38 are open. At the end of 20 seconds, time delay 30 breaks the circuit energizing coil 27, contacts 25 open and counter 37 is deactivated. The system is then ready for a new sequence of events.

The following table shows a three-day operation using a mechanical pig detection system of the prior art and the electrical systems of our invention. The results illustrate that the mechanical system is not reliable for counting detected pigs while our system operated without errors.

TABLE 1

| Time | Counter Reading | | | | Remarks |
|---|---|---|---|---|---|
| | Mechanical | | Electrical | | |
| | Launched | Detected | Launched | Detected | |
| First day: | | | | | |
| 2:00 p.m | 0000 | 0000 | 0003 | 0003 | Initial. |
| 2:40 p.m | 0001 | 0002 | 0004 | 0004 | The time duration is increased by higher temp. |
| 3:35 p.m | 0002 | 0004 | 0005 | 0005 | |
| 3:20 p.m | 0003 | 0006 | 0006 | 0006 | |
| 7:15 p.m | 0004 | 0007 | 0007 | 0007 | No oscillation or no faulty indication during night. |
| 8:30 p.m | 0005 | 0008 | 0008 | 0008 | |
| Second day: | | | | | |
| 8:30 a.m | 0000 | 0000 | 0000 | 0000 | Reset the counters. |
| 10:00 a.m | 0001 | 0002 | 0001 | 0001 | |
| 10:40 a.m | 0002 | 0004 | 0002 | 0002 | |
| 11:45 a.m | 0003 | 0005 | 0003 | 0003 | |
| 1:40 p.m | 0004 | 0006 | 0004 | 0004 | |
| 2:40 p.m | 0005 | 0008 | 0005 | 0005 | |
| 4:30 p.m | 0000 | 0000 | 0000 | 0000 | Reset the counters. No oscillation or no faulty indication during night. |
| Third day: | | | | | |
| 8:15 a.m | 0001 | 0001 | 0001 | 0001 | |
| 9:15 a.m | 0002 | 0003 | 0002 | 0002 | Temp., 80° F. |
| 10:15 a.m | 0003 | 0005 | 0003 | 0003 | Temp., 98° F. |
| 12:20 p.m | 0005 | 0008 | 0001 | 0001 | Temp., 79° F. |
| 1:30 p.m | 0006 | 0010 | 0002 | 0002 | |
| 3:00 p.m | 0002 | 0002 | 0002 | 0002 | Initial. |
| Fourth day: | | | | | |
| 8:30 a.m | 0006 | 0010 | 0006 | 0006 | |

From the description of the operation of this invention it can be seen that the system is extremely versatile. The detector can detect the passage of pigging devices with 100 percent reliability, and it is able to precisely control the launching and alcohol injection processes which are necessary to the efficient cleaning and maintenance of natural gas gathering systems. It can be readily seen that our system is extremely sensitive and can be adapted to centralized control at a distribution headquarters. The information from our detection and launching control system can be telemetered to any desired location within the gathering system for use with computerized techniques for total system control. Cleaning of the entire distribution and gathering system from one central location is but one of the many advantages attainable with our system.

Those skilled in the art will recognize that certain modifications can be made in our invention without departing from the scope thereof. Although reference herein is made to a pigging device in the form of a sphere, any form of device may be used, so long as the device presents a cross section corresponding to that of the fluid transmission line in at least one part of the device, in the present case, a circular cross section. Forms other than spheres, such as but not limited to cylindrical, dumbbell, conical, or disc shapes may be used satisfactorily. The pig of this invention is also not restricted to being formed of hard rubber, and foamed, thermosetting or thermoplastic plastics, metal, glass, and composite bodies or other compositions may be used. It will also be apparent that the nature of the pipeline is irrelevant to our invention, the system working equally well with, for example, lines of metals other than steel or iron, glass, or plastics.

It is also intended that the scope of this invention in the devices and operation of the system here disclosed is not restricted to the heretofore known sole utility of scavenging gathering lines, but is applicable to all fluid and vacuum transport systems wherein detection of devices used for cleaning, indicating, counting, separation of two different fluids therein, or transporting is involved. Thus, the term "pigging" heretofore having a restricted meaning in the gas and petroleum art, is herein used in the above sense and is thereby redefined to cover more than merely scavenging. For example, the pigging devices described herein can be used in other fluid-carrying lines for cleaning purposes or to signal the passage of a fluid interface, e.g. in the transporting of different fluids in a petroleum line. In this embodiment the injection of the pigging devices may be so timed as to coincide with the change from one liquid to another in the line so that a device closely precedes or follows an interface, or acts as a separator.

Also within the scope of this invention is use of the disclosed system in conjunction with conventional pneumatic, "air-veyoring," and "vacuum" systems. In the pneumatic or "air-veyoring" systems, the pig in addition to being used as a separator may also be used, in hollow form with appropriate placement of the magnet, as a carrier receptacle or transport pig. In this latter form, the pig and the detector system of the present invention is useful in conventional "vacuum" systems for the location and counting of transport "pigs."

In a fluid-carrying system, the fluids may be gas, including air, liquid, or fluidized solids, or mixtures of the three, transported in any sequence. Thus, a gas may be transported between two liquids, with pigs acting as separators. Normally, the interface will follow the pig, depending of course on differential pressure in the system and density of the pig, so that the passage of the pig signals a change of fluid to follow, allowing sufficient time for tap-off devices to be actuated. It is to be understood that fluidized solids includes slurries, for example coal slurries, and solids entrained in a gas, including air.

In short, the novel devices and method of detection described herein can be used in any vacuum or fluid-carrying system wherein it is desirable to locate positions of materials within the system.

We claim:

1. A pigging device launch and detection system comprising means or launching a pigging device into a carrying line, electrical sensing means responsive to the passage of a magnet-containing pigging device past a predetermined point on said line, and control means operable in response to signals from said electrical sensing means and adapted to regulate said launch means.

2. The system of claim 1 wherein said electrical sensing means is a wire coil in communication with said line.

3. The system of claim 2 wherein said coil is circumferentially disposed around said line.

4. The system of claim 3 wherein said device is a sphere, and said carrying line is a fluid-carrying line.

5. A pigging device launch and detection system comprising means for launching a pigging device into a fluid-carrying line, electrical sensing means for detecting passage of a magnet-containing pigging device past a predetermined point on said line, alcohol injection means for injecting a predetermined quantity of alcohol into said line at predetermined times, and control means operable in response to signals from said electrical sensing means and capable of regulating said launch means.

6. The system of claim 5 wherein said electrical sensing means is a wire coil in communication with said line.

7. The system of claim 6 wherein said coil is circumferentially disposed around said line.

8. Method of cleaning a gas line and of launching and detecting pigging devices in a gas line having an electrical sensing means responsive to the passage of a magnet-containing pigging device, alcohol injection means and a pigging device launch means comprising (1) electrically sensing the passage of a first magnet-containing pigging device past said sensing means to provide a first signal (2) injecting alcohol into said line downstream of said launching means in response to said signal (3) launching a second magnet-containing pigging device into said gas line in response to said signal upstream of said sensing means and alcohol injection means, and (4) electrically sensing the passage of said second pigging device past said sensing means to provide a second signal.

9. Method of claim 8 wherein said first and second signals actuate electrical counter means for cumulatively recording passage of pigging devices past said sensing means.

10. A system for detecting the passage of a pigging device in a carrying line, said system comprising a pigging device having a permanent magnet therein, electrical sensing means positioned at a predetermined position exterior of and proximate to said line, said electrical sensing means being responsive to the passage of said permanent magnet in said pigging device past said predetermined position, and means spaced from said sensing means and responsive to said sensing means for recording that said pigging device has passed said predetermined position in said carrying line.

11. The system of claim 10 wherein said electrical sensing means comprises a wire coil in proximate communication with said carrying line.

12. The system of claim 11 wherein said coil is circumferentially disposed around said line.

13. The system of claim 10 wherein said carrying line is a natural gas pipeline, first and second pigging devices having permanent magnets therein are spaced from each other in said pipeline, and natural gas is interposed in said pipeline between said first and second pigging devices.

References Cited
UNITED STATES PATENTS

| | | | |
|---|---|---|---|
| 2,601,248 | 6/1952 | Brenholdt | 15—104.06 X |
| 2,953,157 | 9/1960 | Osborne et al. | 15—104.06 X |
| 3,011,197 | 12/1961 | Nehse et al. | 15—104.06 |
| 3,092,991 | 6/1963 | Thompson | 73—3 |
| 3,120,118 | 2/1964 | Boyle | 73—3 |
| 3,148,689 | 9/1964 | Bean et al. | 15—104.06 X |
| 3,232,090 | 2/1966 | Walker | 15—104.06 X |

CHARLES A. WILLMUTH, *Primary Examiner.*

EDWARD L. ROBERTS, *Assistant Examiner.*